3,459,059
**LATERAL-ACTUATION DEVICE, MORE PARTICU-
LARLY ADAPTABLE TO ELECTRIC SWITCHES
OR THE LIKE**
Bernard Jean Olliviero, Les Clayes-sous-Bois, France, assignor to La Telemecanique Electrique, Nanteree, Hauts-de-Seine, France, a joint-stock company of France
Filed Feb. 23, 1968, Ser. No. 707,550
Claims priority, application France, Mar. 3, 1967, 97,459
Int. Cl. F16h *21/44, 25/18;* H01h *13/66*
U.S. Cl. 74—110                                     5 Claims

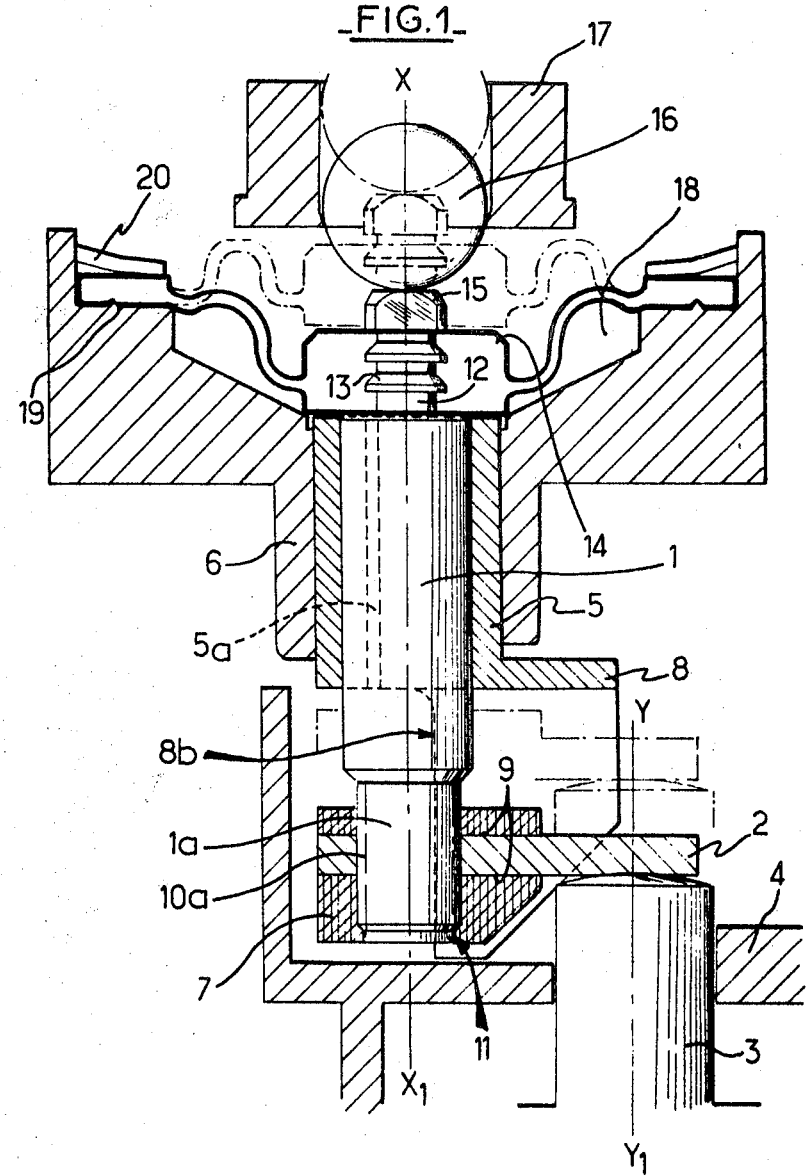

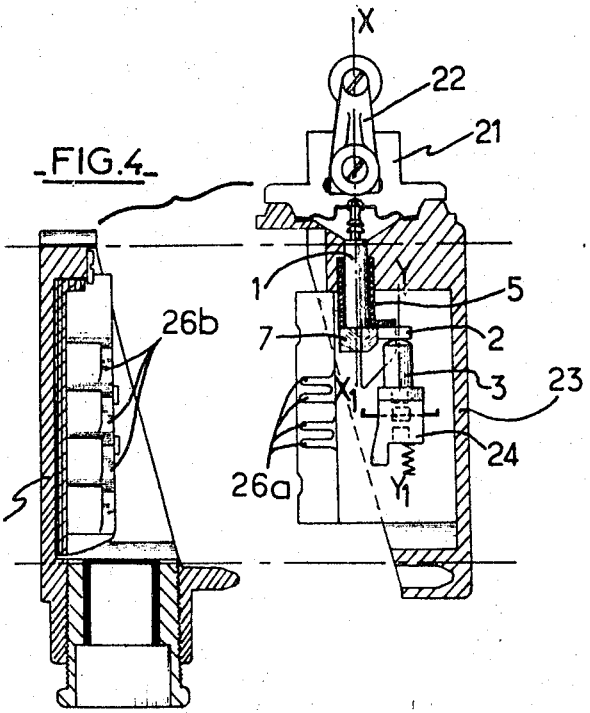
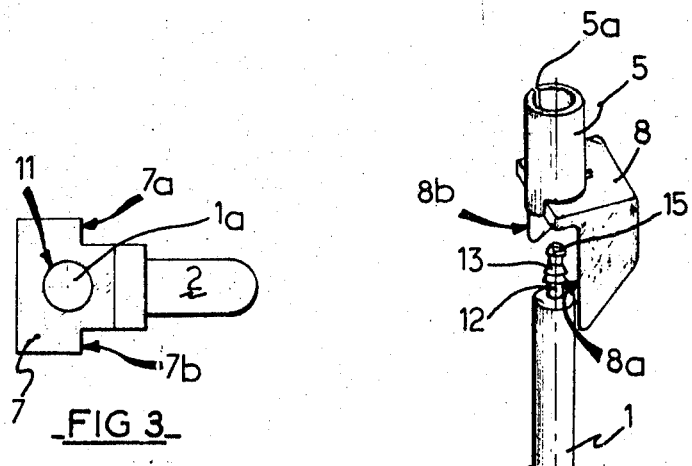

ABSTRACT OF THE DISCLOSURE

A mechanical lateral-actuation device for an electric switch wherein an actuating rod which receives a movement of translation from a control member transmits said movement to a second rod, laterally displaced parallel therewith and controlling the switch, by means of a transfer-guide device reducing the rocking couple on said actuating rod.

---

The present invention relates to a mechanical lateral-actuation device for an electric switch or the like, in which an effort of thrust is applied from the exterior on a sliding rod, which is supported in its turn on another rod subjected to the reaction of a spring, and which is located on an axis parallel to, but eccentric with respect to the first rod.

The problem is to produce a precision mechanism which is not subject to excessive wear in spite of extremely frequent operations. It can readily be seen that when a first member in translation applies a force by means of a square on a rod laterally displaced with respect to the first member, the latter is necessarily subjected to a couple which tends to tilt it, that is to say to wear the guiding parts of the said member, and at the same time to brake the whole of the mechanism. In the particular case of actuating micro-switches, the operation of which is associated with very weak springs, this braking action must be avoided.

The invention provides a remedy for this difficulty. It has for its object to supply a device which reduces the rocking couple on the actuating rod and which provides very simple assembly with a minimum number of parts.

The device in accordance with the invention is essentially characterized by the fact that it comprises, in combination:

A first actuating rod, preferably cylindrical, having a right-angled foot fixed to its base;

A second rod laterally displaced parallel with respect to the first and actuated by contact with the extremity of the foot;

A guiding sleeve for the first rod;

A shoe, preferably of plastic material, which surrounds the joint of the foot with the actuating rod, and which comprises at least one friction line or surface turned towards the axis of the second rod and as close as possible to this rod;

A transfer-guide member comprising at least one surface located between the two rods and parallel to these rods, and which receives the friction action of the shoe.

The invention is also directed, by way of new industrial products, to the devices and more particularly to the limit switches utilized in the automatic control of machine tools, utilizing the lateral actuating device specified above.

Other characteristic features, advantages and special-ities of the present invention will be brought out in the description which follows below, reference being made to the accompanying drawings, in which:

FIG. 1 is a view in longitudinal axial section to a very large scale, of one possible form of construction of a lateral-actuation device in accordance with the present invention;

FIG. 2 is an exploded view in perspective on a smaller scale, of the constituent parts of the device shown in FIG. 1;

FIG. 3 is a view looking on the underside of the blade and of the brake of the presser-foot;

FIG. 4 is an exploded view in axial longitudinal section of the component parts of a limit switch for machine-tools utilizing an application of the actuating device according to the invention.

The lateral-actuating device for an electric switch or the like which is shown by way of example in FIGS. 1, 2 and 3, is essentially constituted by the following elements:

A first actuating rod 1, preferable cylindrical, capable of receiving a movement of translation along its longitudinal axis $X-X_1$;

A foot 2 mounted at right angles on the base 1a of the actuating rod 1;

A second rod 3, displaced laterally parallel with respect to the first and adapted to slide along its longitudinal axis $Y-Y_1$ under the action of the right-angle foot 2, the free extremity of which makes contact with the head of the rod 3. This latter rod, which operates an electric switch or the like (not shown in FIG. 1) is subjected to the action of a return spring and slides in an opening formed in the frame 4 of the apparatus;

A sleeve 5 serving as a guiding means for the first rod 1 and advantageously provided with a slot 5a which enables it to be housed during assembly in the frame 6 of the apparatus which carries it. The diameter of the rod 1 is determined so as to slide with easy friction inside the sleeve 4 when the latter is housed in the frame 6;

A shoe 7, preferably of plastic material, which surrounds the joint between the right-angled foot 2 and the actuating rod 1, the said shoe comprising at least one friction line or surface, such as the surfaces 7a and 7b which can clearly be seen from FIG. 3. These friction surfaces are turned towards the axis $Y-Y_1$ of the second rod 3 and are as close as possible to this latter;

A transfer-guide member having the general reference 8, which comprises at least one guiding surface such as the surfaces 8a, 8b which are clearly shown in FIG. 2. These guiding surfaces are located between the two rods 1 and 3, and are parallel to these latter, co-operating with the friction action of the surfaces 7a and 7b of the shoe 7.

Advantageously, the transfer-guide member 8 and the sleeve 5 ensure the guiding of the sliding-rod 1 and consist of one single moulded part of plastic material, as is clearly shown in FIGS. 1 and 2. Furthermore, it can be seen from FIG. 2 that the transfer-guide member is preferably given the shape of a fork or a presser-foot, the arms of which form two flat surfaces 8a, 8b, on which slide the two projecting portions 7a and 7b of the shoe 7.

The shoe 7 comprises a cavity 9 which passes right through perpendicular to the axis $X-X_1$ of the actuating rod 1, the blade 2 being housed inside the said cavity.

Furthermore, the lower extremity 1a of the rod 1 comprises a threaded portion 10a which screws into the blade 2, having a threaded hole for this purpose, and is also screwed by a self-screwing action into the lower part 11 of the shoe 7, which has the effect of forming a brake-screw.

The head of the acting rod 1 is provided with an axial extension 12 comprising on the one hand fillets 13 which permit the central fixing of a fluid-tight diaphragm 14 serving as a protection against dust, and on the other hand a nipple 15 on which is carried a ball 16 adapted to slide in a guiding sleeve 17 under the action of an appropriate operating system, not shown in FIG. 1.

The extension 12 is located in the axis of a conical recess 18 of the frame 6, the circular edge of the diaphragm 14 being held in position on a shoulder 19 of the frame by means of an elastic ring 20.

It can immediately be seen from examination of FIG. 1 that the whole of the system can pass from the top position shown in chain-dotted lines to the bottom position shown in full lines without giving rise to any undesirable rocking couple which would be the case with a conventional overhung system. This advantage is all the more appreciable in that it is applied to a mechanism especially intended to actuate micro-switches, the operating of which is associated with springs of very low power.

The device according to the invention which has just been described is applicable in a particularly advantageous but not exclusive manner to limit switches utilized in the automatic control of machine tools.

An application of this kind will now be described with reference to FIG. 4.

It will first be recalled that the practice in this application requires that with such switches, the actuating member or lever head, indicated by the general reference 21 in FIG. 4 can be orientated at will in two perpendicular directions, that is to say this head is generally of square shape, which permits the operating lever 22 to be orientated in two pivotal planes at right angles, which provides four possible mountings at the head 21 on the casing 23.

In addition, experience has shown that the whole of the mechanism constituted by the switch shown diagrammatically at 24, and the operating head 21–22, which assembly is housed in the portion 23 of the casing, must be capable of being plugged into a base 25 fixed on the machine-tool, this base carrying the electrical connection devices. To this end, the complementary portions 23 and 25 of the casing comprise a system of male and female plugs 26a, 26b capable of fitting one into the other.

However, in order to reduce the projection which such an assembly may form, it is preferably to bring the shape of the casing to a square section, and for this purpose to assemble the part 23 comprising the actuating system to the base portion 25 by giving to each the average thickness of half the square, as can clearly be seen from FIG. 4.

It then becomes necessary to reduce the thicknesses of each internal member which results in a displacement between, on the one hand the axis $X-X_1$ of the actuating rod 1, subjected in turn to the action of the pivoted lever 22, and on the other hand the axis $Y-Y_1$ of the operating rod 3 of the switch 24.

It can immediately be seen that the actuating device according to the invention enables this problem to be solved in a particularly simple and effective manner, without thereby adversely affecting in any way the quality of the mechanism.

In order to avoid unnecessary complication of the description, the actuating device will not be described a second time, and it will be sufficient to transfer to FIG. 4 the constituent parts and their references of FIGS. 1 to 3.

It will, of course, be understood that the present invention has been described and illustrated only in a purely explanatory manner and without any limitation, and that any modification of detail may be made thereto in accordance with its spirit, without thereby departing from the scope of the present invention.

I claim:
1. A translation actuating device, more particularly adaptable to electric switches and especially to limit switches utilized in the automatic control of machine-tools, the said device being characterized in that it comprises, in combination:
   a first actuating rod, preferably cylindrical, and fixed at its base to a right-angled foot;
   a second rod laterally displaced parallel with respect to the first and actuated by contact with the extremity of the right-angled foot;
   a sleeve ensuring the guiding of the first rod;
   a shoe preferably of plastic material, surrounding the joint of the foot with the first actuating rod, and comprising at least one friction surface turned towards the axis of the second rod and as close as possible to the second rod;
   a transfer-guide member comprising at least one surface located between the said first and second rods and parallel to these rods, receiving the friction action of the said shoe.

2. An actuating device in accordance with claim 1, characterized in that the said transfer-guide member and the slide sleeve of the first rod constitute one single moulded part of plastic material, the transfer-guide member being given the shape of a presser-foot, the arms of which comprise two flat surfaces on which slide two projecting portions with which the shoe is provided.

3. An actuating device in accordance with claim 1, characterized in that the sleeve is split in order to be housed during assembly in the frame by which it is carried, while the diameter of the first rod is determined in such manner as to slide with easy friction in the said sleeve, when the latter is incorporated in the frame by which it is carried.

4. An actuating device in accordance with claim 1, characterized in that the said shoe is traversed by a cavity perpendicular to the axis of the actuating rod, and in which is housed the blade which constitutes the said foot.

5. An actuating device in accordance with claim 1, characterized in that the first actuating rod is threaded at its base and its threaded portion passes through the shoe and the blade into which it is screwed, the said shoe being provided, under the blade, with a hole for the passage of the threaded portion of the said first actuating rod having a diameter less than that of the threaded portion of the base of the said rod, so as to constitute a brake-screw.

References Cited

UNITED STATES PATENTS

| | | | |
|---|---|---|---|
| 450,722 | 4/1891 | Dickey | 74—110 |
| 1,343,008 | 6/1920 | Sauvage | 74—110 |
| 3,345,490 | 10/1967 | Gerjets et al. | 74—110 |
| 3,167,626 | 1/1965 | Rochette et al. | 200—159 |

FRED C. MATTERN, Jr., Primary Examiner

W. S. RATLIFF, Jr., Assistant Examiner

U.S. Cl. X.R.

200—159